Patented May 21, 1940

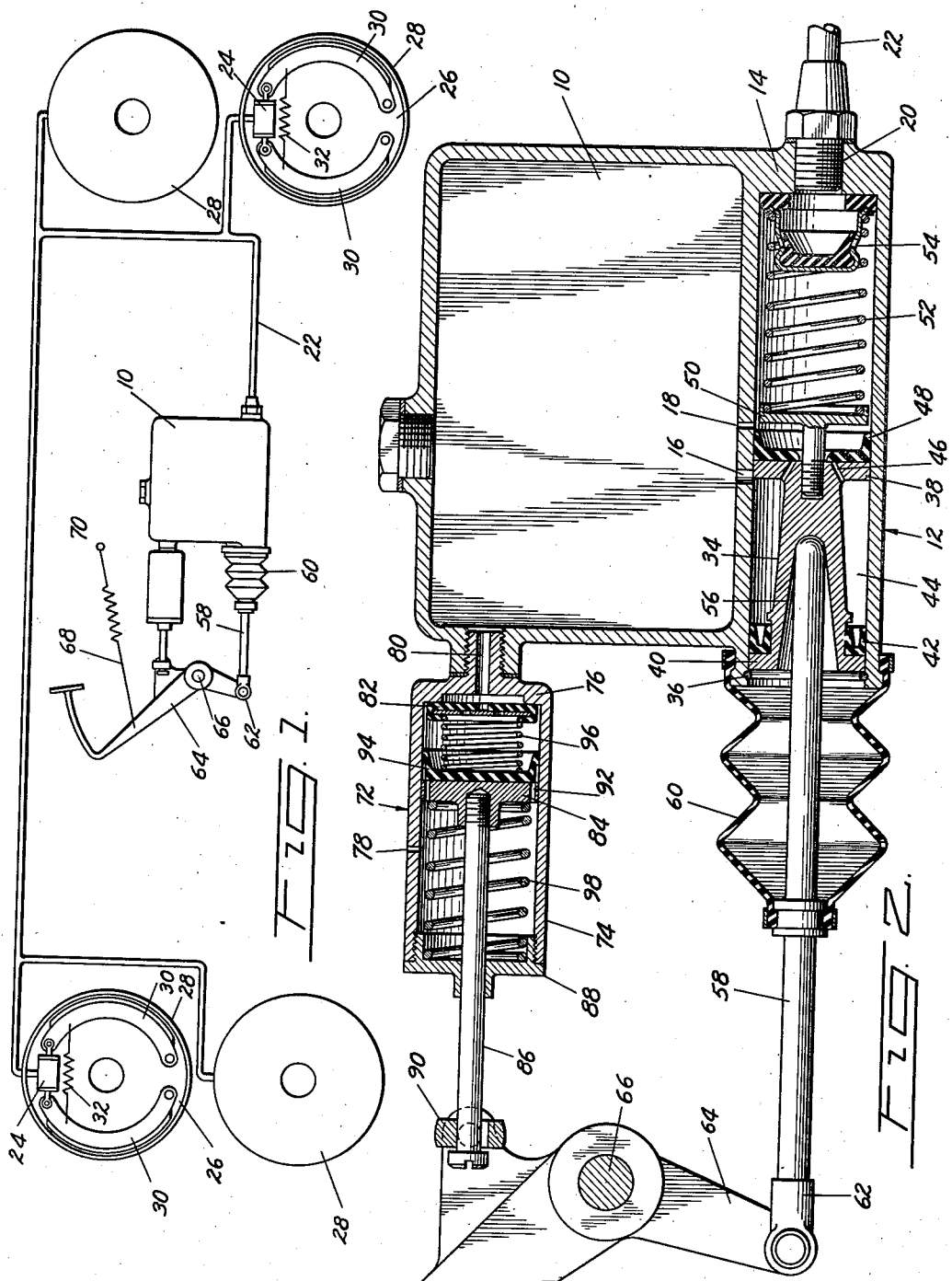

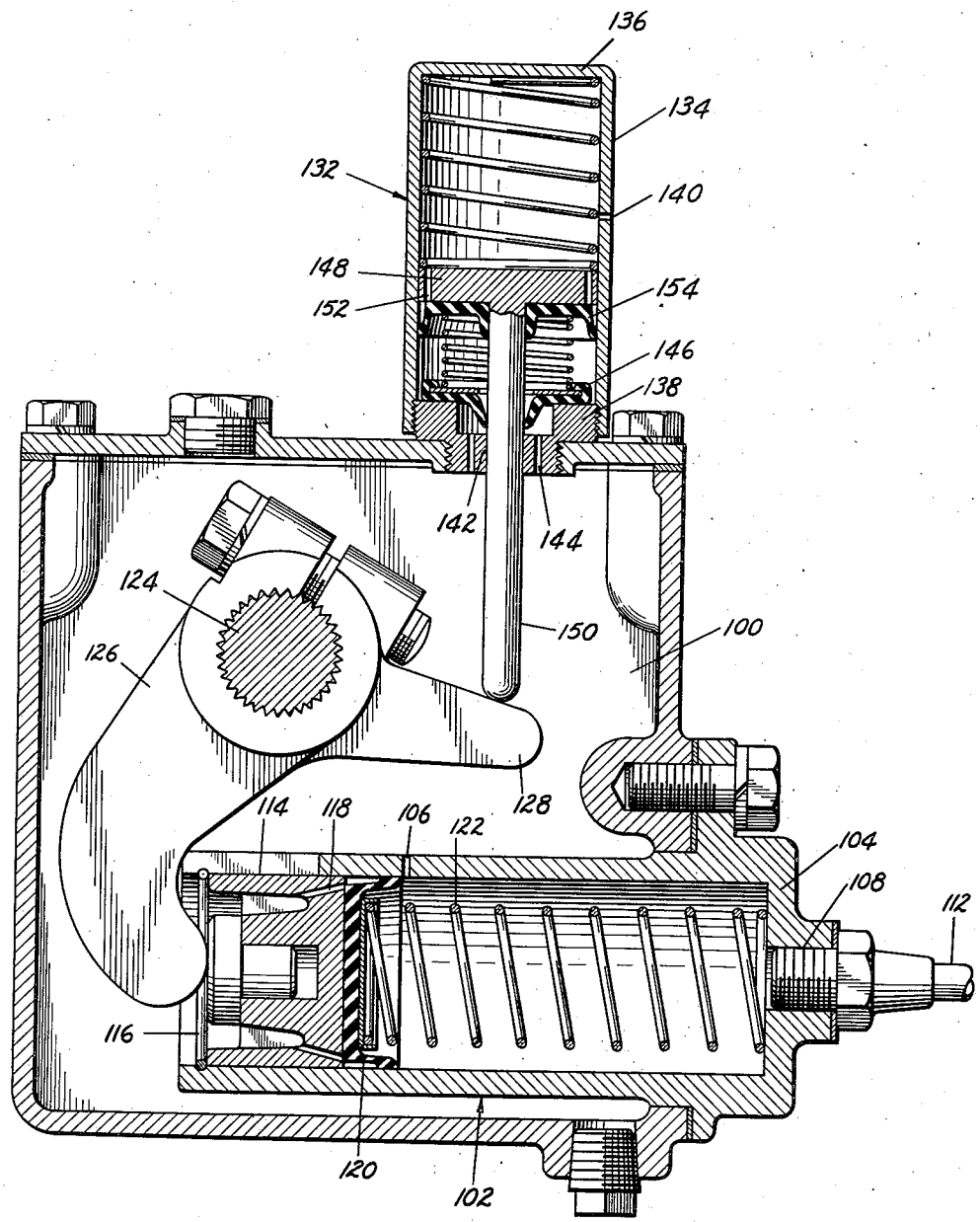

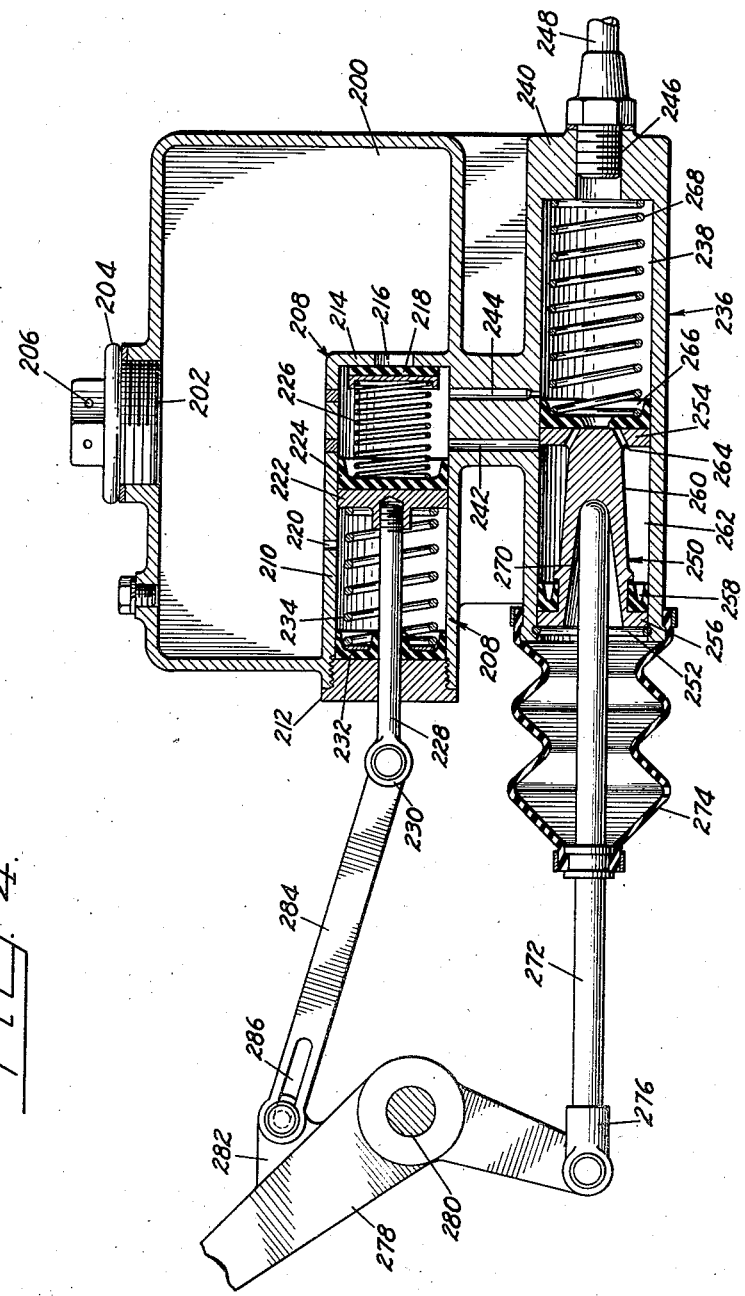

2,201,518

UNITED STATES PATENT OFFICE 2,201,518

FLUID PRESSURE BRAKING SYSTEM

Herbert C. Bowen, Detroit, Mich., assignor to Hydraulic Brake Company, Detroit, Mich., a corporation of California Application September 20, 1937, Serial No. 164,636

3 Claims. (Cl. 188—152)

This invention relates to fluid pressure braking systems for motor vehicles.

An object of the invention is to maintain a predetermined pressure on the fluid in the system so as to avoid sucking of air into the system, and to insure that the system is maintained full of fluid.

Another object of the invention is to provide a fluid pressure braking system including a fluid pressure producing device having automatically operated means for maintaining a predetermined pressure on the fluid in the system.

Other objects of the invention will appear from the following description taken in connection with the drawings forming a part of this specification, and in which—

Fig. 1 is a diagrammatical illustration of a fluid pressure braking system embodying the invention;

Fig. 2 is a sectional view of a reservoir having associated therewith a fluid pressure actuating device and a pump mechanism for maintaining pressure on the fluid in the reservoir;

Fig. 3 is a vertical sectional view of a modified fluid pressure producing device embodying the invention; and Fig. 4 is a vertical sectional view of another modified fluid pressure producing device embodying the invention.

Referring to the drawings for more specific details of the invention, 10 represents a fluid reservoir of conventional type having at its bottom a cylinder 12 open at one end and closed at its other end by a head 14. The cylinder has ports 16 and 18 arranged in its wall, providing communications between the cylinder and the reservoir, and a discharge port 20 arranged in its head.

A fluid pressure delivery pipe or conduit 22 connected to the discharge port 20 has a plurality of branches connected respectively to fluid pressure actuated motors 24 arranged in pairs, one pair for actuating the brakes associated with the front wheels of a vehicle and another pair for actuating the brakes associated with the rear wheels of the vehicle.

The brakes are of conventional type each including a fixed support or backing plate 26 adapted to be secured to an axle or to an axle housing, a rotatable drum 28 associated with the backing plate adapted to be suitably secured to a wheel, a pair of coresponding interchangeable friction elements or shoes 30 having their articulate ends pivoted on the backing plate, a retractile spring 32 connecting the shoes, and a motor corresponding to the motors 24 mounted on the backing plate between the shoes and operative to spread the shoes into engagement with the drum against the resistance of the retractile spring 32.

A piston 34, reciprocable in the cylinder 12 and held against displacement by a retaining ring 36 seated in a groove in the wall of the cylinder adjacent its open end, has a head 38, a skirt 40 supporting a leak-proof cup 42 for inhibiting the seepage of fluid from the cylinder past the piston, and a reduced body portion providing in conjunction with the wall of the cylinder an annular chamber 44 communicating with the reservoir by way of the port 16.

The head 38 of the piston has a plurality of passages 46 therein providing communications between the annular chamber 44 and that portion of the cylinder 12 forward of the piston, and a sealing cup 48 seated on the head controls the passages. A spring seat 50 mounted concentrically on the head of the piston retains the cup against displacement, and a spring 52 interposed between the seat 50 and a two-way valve 54 seated on the head of the cylinder for control of the discharge port 20 serves to retain the valve against displacement and also to return the piston to its retracted position.

A recess 56 in the back of the piston receives one end of a thrust rod 58 having sleeved thereon a flexible boot 60 embracing the open end of the cylinder for the exclusion of dust and other foreign substances from the cylinder, and the other end of the thrust rod is pivotally connected by a clevis 62 to a foot pedal lever 64 rockable on a shaft 66 and connected as by a retractile spring 68 to a fixed support 70.

An air pump indicated generally at 72 is mounted on the wall of the reservoir adjacent the top thereof and in direct communication with the reservoir. As shown, the pump includes a cylinder 74 closed at one end as by a head 76 and open at its other end. The cylinder has an intake port 78 and a discharge port 80 opening into the reservoir, and the discharge port is controlled by a two-way valve 82.

A piston 84 reciprocable in the cylinder 74 has connected thereto a rod 86 extending through a detachable head 88 suitably secured in the open end of the cylinder, and this rod is attached as by an overrunning connection 90 to a foot pedal lever 64. The piston has a plurality of spaced passages 92 therein providing communications between that portion of the cylinder back of the piston and that portion of the cylinder forward of the piston, and a collapsible sealing cup 94 seated on the piston controls the passages. A light spring 96 interposed between the cup 94 and the two-way valve 82 serves to retain the cup and valve against displacement, and a relatively heavy spring 98 interposed between the back of the piston and the detachable head 88 normally impose a predetermined load on the piston so that a constant pressure on the fluid in the reservoir may be maintained.

In a normal operation, upon depressing the foot pedal lever 64, force is transmitted therefrom through the rod 58 to the piston 34, resulting in moving the piston on its compression stroke. During the initial movement of the piston on its compression stroke the cup 48 covers the port 18, and thereafter, as the piston progresses, fluid is displaced from the cylinder 12 past the two-way valve 54, through the port 20 and the fluid pressure pipe 22 and its respective branches into the motors 24, causing energization of the motors and resulting in actuation of the shoes 30 into engagement with the drums 28 against the resistance of the retractile springs 32 connecting the shoes of the respective brakes. Upon release of the applied force, the foot pedal lever 64 is returned to its retracted position under the influence of the retractile spring 68, and this movement of the foot pedal lever retracts the thrust rod 58, resulting in release of the piston 34, whereupon the piston is returned to its retracted postion under the influence of the spring 52.

As the piston 34 returns to its retracted position, a partial vacuum is created in that portion of the cylinder 12 forward of the head of the piston, resulting in drawing fluid from the reservoir 10 through the port 16 into the cylinder back of the head of the piston, thence through the ports 46 in the head of the piston past the cup 48 into that portion of the cylinder forward of the piston, completely filling the system.

During this period fluid is returning to the cylinder 12 from the fluid pressure delivery pipe 22 and its branches, and the motors 24 connected to the respective branches, under the influence of the retractile springs 32, connecting the shoes of the respective brakes. The quantity of fluid received by the cylinder may be in excess of that required to completely fill the cylinder, and in that event such excess fluid as may be received by the cylinder is displaced therefrom through the port 18 into the reservoir.

The air pump 72 is automatically operative to maintain a predetermined pressure on the fluid in the system. In a normal operation of the air pump incident to a drop in the pressure on the fluid in the system, upon depressing the foot pedal lever 64 to apply the brakes, the overrunning connection 90 between the foot pedal lever 64 and the rod 86 of the piston 84 is taken up, and the piston 84 is moved against the resistance of the spring 98, resulting in drawing air through the port 78 into the cylinder 74, thence through the passages 92 in the piston, past the cup 94, into that portion of the cylinder forward of the piston, thence past the two-way valve 82 into the reservoir. The pressure on the fluid in the system is equal to the load on the spring 98, and in instances where the pressure on the fluid exceeds the load on the spring 98, the valve 82 opens against the resistance of the spring 96, whereupon the pressure acting on the piston 84 moves the piston past the port 78 so that excess air may escape.

A modification of the invention is illustrated in Fig. 3. In this modification a fluid reservoir 100 of conventional type has a cylinder 102 mounted in its wall adjacent the bottom of the reservoir. One end of the cylinder is closed as by a head 104, suitably secured to the wall of the reservoir outside of the reservoir, and the other end of the cylinder opens into the reservoir. The cylinder has in its wall a port 106 providing a communication betwen the cylinder and the reservoir, and arranged in the head of the cylinder is a discharge port 108 connectd by a fluid pressure delivery pipe or conduit 112 to fluid pressure actuated motors associated with the brakes of the structure shown in the preferred embodiment of the invention.

A piston 114 reciprocable in the cylinder 102 is held against displacement by a retaining ring 116 seated in a groove in the wall of the cylinder adjacent the open end of the cylinder. The piston has in its head a plurality of spaced passages 118 providing communications between the reservoir and that portion of the cylinder forward of the piston, and a collapsible sealing cup 120 seated on the head of the piston controls the passages 118. A spring 122 interposed between the cup and the head of the cylinder retains the cup against displacement and also serves to return the piston to its retracted position.

A rockable shaft 124 mounted transversely of the reservoir has keyed thereto, within the reservoir, an actuator 126 engaging the piston 114, and the actuator has an arm 128, the purpose of which will hereinafter appear. The shaft may be rocked by any suitable means, such as the conventional foot pedal lever and linkage connecting the lever to the shaft now in general use in a fluid pressure braking system.

An air pump indicated generally at 132 is suitably mounted on the top of the reservoir 100 in direct communication with the reservoir. The pump includes a cylinder 134 closed at one end as by a head 136 and open at its other end. A detachable head 138 suitably secured in the open end has a part fitted into an opening in the top of the reservoir. The cylinder has an intake port 140, and the detachable head has a concentric opening 142, the purpose of which will hereinafter appear, and a plurality of discharge ports 144 opening into the reservoir controlled as by a two-way valve 146 seated on the detachable head 138 within the cylinder.

A piston 148 reciprocable in the cylinder 134 has attached to its head a rod 150 extending through the opening 142 in the detachable head of the cylinder and adapted to engage the arm 128 on the actuator 126. The piston has a plurality of passages 152 providing communications between that portion of the cylinder back of the piston and that portion of the cylinder forward of the piston. A collapsible sealing cup 154 seated on the head of the piston controls the passages 152. A light spring interposed between the cup and the two-way valve serves to retain the cup and valve against displacement, and a relatively heavy spring interposed between the back of the piston and the closed end of the cylinder imposes a predetermined load on the piston proportionate to the pressure required on the fluid in the reservoir.

In the operation of this embodiment of the invention, the shaft 124 is moved through an angle as by a conventional foot pedal lever, such as is shown in the preferred embodiment of the invention, and suitable linkage connecting the lever to the shaft, such as is now in general use. The applied force incident to this movement of the shaft is transmitted through the actuator 126 to the piston 114, resulting in movement of the piston on its compression stroke.

During the initial movement of the piston on its compression stroke, the cup 120 on the piston 114 covers the port 106, and thereafter, as the piston advances, fluid is discharged from the cylinder 102, through the port 108 and fluid pressure delivery pipe 112 into fluid pressure actuated motors, resulting in energization of the motors accompanied by actuation of the brakes as in the preferred embodiment of the invention.

Upon release of the applied force the actuator 126 is returned to its retracted position, resulting in release of the piston 114, whereupon the piston is returned to its retracted position under the influence of the spring 122. As the piston returns to its retracted position, a partial vacuum is created in that portion of the cylinder 102 forward of the piston, resulting in drawing fluid from the reservoir through the passages 118 in the piston past the sealing cup 120 into that portion of the cylinder forward of the piston, completely filling the cylinder. During this period fluid is returning to the cylinder from the fluid pressure motors and the fluid pressure delivery pipe 112, as in the preferred embodiment of the invention. Under this condition, the cylinder may receive fluid in excess of the quantity required to fill the cylinder, and, in such instances, the excess fluid is returned from the cylinder to the reservoir by way of the port 106.

A predetermined pressure is maintained on the fluid in the system by the automatically operated air pump 132. The pressure maintained on the fluid is equal to the load on the spring-pressed piston 148. Should there occur a drop in the pressure on the fluid in the system, the piston is urged downwardly by the spring, and this movement of the piston advances the rod 150 carried by the piston so as to engage the rod with the arm 128 on the actuator 126. Accordingly, upon movement of the actuator, as in a normal braking operation, the piston 148 is moved upwardly, and this results in drawing air through the port 140 into the cylinder 134, thence through the ports 152 in the piston, past the sealing cup 154, thence past the two-way valve 146 into the reservoir. Should the pressure on the fluid in the system be in excess of that determined by the heavy spring, the pressure on the fluid opens the two-way valve and raises the piston past the port so that sufficient air may escape to maintain the pressure desired.

Another modification of the invention is illustrated in Fig. 4. In this modification a fluid reservoir 200 of conventional type has a filling opening 202 normally closed as by a plug 204 provided with openings 206 for venting the reservoir to the atmosphere.

A fluid pump 208 in the bottom of the reservoir includes a cylinder 210, having one end closed as by a head 212 arranged outside of the reservoir and its other end closed as by a head 214 having a port 216 providing a communication between the cylinder and the reservoir, and a valve 218 seated on the head 214 controls the port 216. The cylinder also has in its wall a port 220 providing another communication between the cylinder and the reservoir.

A piston 222 reciprocable in the cylinder 210 has on its head a sealing cup 224, and a light spring 226 interposed between the cup and the valve 218 serves to retain the cup and valve against displacement. A rod 228, attached at one of its ends to the piston 222, extends through a concentric opening in the head 212 of the cylinder, and on the other end of the rod is a clevis 230. A leak-proof washer 232, sleeved on the rod 226 and seated on the head 212 of the cylinder, inhibits the seepage of fluid from the cylinder, and a spring 234 interposed between the washer and the back of the piston 222 serves to retain the washer against displacement and also to impose a predetermined load on the piston equal to the pressure desired on the fluid in the system.

A fluid pressure producing device indicated generally at 236 includes a cylinder 238 formed at the base of the reservoir. This cylinder has one of its ends open and its other end closed as by a head 240, and arranged in the wall of the cylinder are ports 242 and 244 providing communications between the cylinder 238 and that portion of the cylinder 210 forward of the piston 222. A discharge port 246 in the head of the cylinder 238 has connected thereto a fluid pressure delivery pipe or conduit 248, and connected to this conduit are fluid pressure actuated motors arranged for the actuation of brakes as in the preferred embodiment of the invention.

A piston 250 reciprocable in the cylinder 238 is held against displacement by a retaining ring 252 seated in a groove in the wall of the cylinder adjacent the open end thereof. The piston 250 includes a head 254, a skirt 256 supporting a sealing cup 258 for inhibiting the seepage of fluid from the cylinder past the piston, and a reduced body portion 260 providing in conjunction with the wall of the cylinder an annular chamber 262 communicating with the cylinder 210 by way of the port 242. The head of the piston 250 has a plurality of ports 264 providing communications between the annular chamber and that portion of the cylinder 238 forward of the piston. A sealing cup 266 seated on the head of the piston controls the ports, and a spring 268 interposed between the cup and the head of the cylinder 238 retains the cup against displacement and also returns the piston to its retracted position.

A recess 270 in the back of the piston 250 receives one end of a thrust rod 272 having sleeved thereon a flexible boot 274 embracing the open end of the cylinder 238 for the exclusion from the cylinder of dust and other foreign substances, and on the other end of the thrust rod is a clevis 276. A foot pedal lever 278 of conventional type is pivotally mounted on a stub shaft 280 and connected as by a retractile spring, not shown, to a fixed support. The foot pedal lever is pivotally connected to the clevis 276 on the thrust rod 272, and a lug 282 on the lever is attached to one end of a link 284 by an overrunning connection 286, and the other end of the link is pivotally connected to the clevis 230 on the rod 228 of the piston 222 of the fluid pump 208.

In a normal operation of this embodiment of the invention, upon depressing the foot pedal lever 278, force is transmitted therefrom through the thrust rod 272 to the piston 250, resulting in movement of the piston on its compression stroke. During the initial movement of the piston, the cup 266 on the head of the piston covers the port 244, and thereafter, as the piston advances on its compression stroke, fluid is displaced from the cylinder 238 through the discharge port 246 and fluid pressure delivery pipe 248 into fluid pressure motors connected between the friction elements of the brakes, as in the preferred embodiment of the invention, resulting in actuation of the brakes.

At the conclusion of a braking operation, upon release of the applied force, the foot pedal lever 278 is returned to its retracted position under the influence of a retractile spring, not shown, and this movement of the lever retracts the thrust rod 272 resulting in release of the piston 250, whereupon the spring 268 becomes effective to return the piston to its retracted position. As the piston 250 returns to its retracted position, a partial vacuum may be created in that portion of the cylinder 238 forward of the piston, resulting in drawing fluid from the pump cylinder 210, through the port 242 into the cylinder 262 back of the head 254 of the piston 250, thence through the passages 264 in the piston 250 past the cup 266, into that portion of the cylinder 238 forward of the piston, completely filling the cylinder. This may result in a slight movement of the pump cylinder under the influence of the spring 234; however, during this period, fluid is returning to the cylinder 238 from the fluid pressure delivery pipe and fluid pressure actuated motors connected to the cylinder, and under this condition the pressure on the fluid in the system is maintained fairly constant. Should there occur a drop in the pressure on the fluid, the piston 222 is moved under the influence of the spring 234, and this results in taking up the overrunning connection 286 and movement of the piston against the resistance of the spring 234 upon actuation of the foot pedal lever during a normal application of the brakes, and this movement of the piston 222 draws fluid from the reservoir past the valve 218 into the system. Should the quantity of fluid drawn into the system be in excess of that required to maintain the desired pressure, the piston is moved, against the resistance of the spring, beyond the port 220 so that a portion of the fluid may be returned to the reservoir.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. In a fluid pressure system of the class described, the combination of a compression cylinder, a piston reciprocable in said cylinder, a reservoir for supplying said cylinder with fluid, operating means for reciprocating said piston, a discharge port for said cylinder, a second cylinder communicating with the reservoir, a second piston in said second cylinder, a spring in said second cylinder urging said second piston in a direction to create fluid pressure in both of said cylinders, linkage connecting said second piston and said piston operating means, said linkage permitting movement of said operating means in one direction independently of said second piston, and a port in said second cylinder limiting the pressure created in said fluid system by expansion of the fluid therein.

2. In a fluid pressure system of the class described, the combination of a compression cylinder, a piston reciprocable in said cylinder, a reservoir for supplying said cylinder with fluid, operating means for reciprocating said piston, a discharge port for said cylinder, a spring for returning said piston, a second cylinder communicating with the reservoir, a second piston in said second cylinder, a second spring in said second cylinder urging said second piston in a direction to create fluid pressure in both of said cylinders, linkage connecting said second piston and said piston operating means, said linkage permitting movement of said operating means in one direction independently of said second piston, said linkage being so dimensioned and arranged that each normal movement of said operating means is available to create return movement of said second piston, and a port in said second cylinder limiting the pressure created in said fluid system by expansion of the fluid therein.

3. In a fluid pressure system of the class described, the combination of a compression cylinder, a piston reciprocable in said cylinder, a reservoir for supplying said cylinder with fluid, operating means for reciprocating said piston, a discharge port for said cylinder, a spring for returning said piston, a second cylinder communicating with the reservoir, a second piston in said second cylinder, a second spring in said second cylinder urging said second piston in a direction to create fluid pressure in both of said cylinders, linkage connecting said second piston and said piston operating means, said linkage permitting movement of said operating means in one direction independently of said second piston, said linkage being so dimensioned and arranged that each normal movement of said operating means is available to create return movement of said second piston, a valve in one end of said second cylinder, a spring interposed between said second piston and valve, and a port in said second cylinder limiting the pressure created in said fluid system by expansion of the fluid therein.

HERBERT C. BOWEN.